United States Patent Office 3,557,240
Patented Jan. 19, 1971

3,557,240
DIMERIZATION OF CYCLOPENTADIENE IN ISOPRENE STREAMS
Herbert J. Gebhart, Jr., Ferguson, and Earle C. Makin, Jr., St. Louis, Mo., assignors to Monsanto Company, St. Louis, Mo., a corporation of Delaware
No Drawing. Continuation-in-part of abandoned application Ser. No. 634,494, Apr. 28, 1967. This application Dec. 31, 1969, Ser. No. 889,700
Int. Cl. B01d 3/14, 3/34; C07c 7/00
U.S. Cl. 260—681.5       4 Claims

ABSTRACT OF THE DISCLOSURE

A process for dimerizing the cyclopentadiene in a stream containing cyclopentadiene and a $C_5$ conjugated diolefin comprising heat-treating the stream from one to three hours at a temperature of from 90 to 110° C. The pressure is regulated during the heat-treatment so that the stream is boiling.

BACKGROUND OF THE INVENTION

The present application is a continuation-in-part of application Ser. No. 634,494 filed Apr. 28, 1967, now abandoned.

The present invention relates generally to the purification of hydrocarbon streams. More particularly, the present invention relates to the purification of hydrocarbons containing cyclopentadiene and a conjugated diolefin of similar boiling point such as isoprene.

In any chemical process such as the cracking of hydrocarbons, considerable quantities of unsaturated hydrocarbons of various boiling points are produced. Among these are compounds such as olefins, diolefins, unsaturated cyclic compounds, etc. Rough separation of these materials may be made by distillation, but this tool is wholly incapable of substantially completely and quantitatively separating substances such as cyclopentadiene from materials of similar boiling points such as isoprene and piperylene. For example, a typical $C_5$ cut from the cracking of hydrocarbon may contain about 1% $C_4$'s, 27% isoprene, 18% piperylene, 14% cyclopentadiene, 22% pentenes, 17% pentanes, and 1% $C_6$ hydrocarbons. It has been found in the prior art that separation of cyclopentadiene from a stream containing other conjugated diolefins such as isoprene and piperylene may be facilitated by first subjecting the stream to conditions of heat-treatment under which the cyclopentadiene dimerizes to dicyclopentadiene. As the dicyclopentadiene boils about 130° C. above the remainder of the stream, it is easily separated therefrom. Hhe dicyclopentadiene can then be depolymerized to cyclopentadiene or can be further purified to produce a dicyclopentadiene suitable for use in polymers and copolymers. The remaining $C_5$ hydrocarbons can be subjected to further fractional distillation and/or extractive distillation to recover the conjugated dienes such as isoprene and piperylene. However, one of the drawbacks of the prior art processes of heat-treatment is that they are conducted under such conditions that the cyclopentadiene is not only dimerized to dicyclopentadiene but is also codimerized with the conjugated diolefins of similar boiling points, i.e., isoprene and piperylene, so as to form a codimer. This unwanted codimerization results in ultimate loss of cyclopentadiene and loss of valuable isoprene and piperylene.

It is an object of the present invention to provide a process for the purification of hydrocarbon streams.

It is a further object of the present invention to provide a process for the purification of a hydrocarbon stream containing cyclopentadiene and other $C_5$ conjugated diolefins in which losses from the codimerization of the cyclopentadiene and the $C_5$ conjugated diolefins are reduced.

Additional objects will become apparent from the following description of the invention herein disclosed.

SUMMARY OF THE INVENTION

This and other objects may be accomplished by the present invention, which in one of its embodiments, is an improvement in a continuous process for the purification of a hydrocarbon stream containing cyclopentadiene and other $C_5$ conjugated diolefins wherein said stream is passed to a dimerization zone and heated in order to dimerize a major portion, at least 90% by wt., of the cyclopentadiene and the resulting dimers are separated from the effluent of the dimerization zone, which improvement comprises maintaining at least a portion of said stream refluxing while in said dimerization zone, maintaining the pressure within said zone so as to cause the temperature of said stream to be within the range of about 90 to 110° C., and maintaining the residence time of said stream in the dimerization zone to be within about 1 to 3 hours. If the dimerization is conducted under these conditions, it has been found that losses from the codimerization of cyclopentadiene with the other $C_5$ conjugated diolefins will be reduced.

DESCRIPTION OF THE PREFERRED EMBODIMENTS

As may be seen, the present invention is applicable to the purification of hydrocarbon streams containing cyclopentadiene and other heat polymerizable $C_5$ conjugated dienes, in particular, isoprene and piperylene. The streams to which the present invention is applicable generally should contain *at least 5 percent by weight cyclopentadiene*, for example from about 5 to 90 percent cyclopentadiene, but preferably from about 8 to 80 percent by weight of cyclopentadiene. Further, the most advantageous results are accomplished by the present invention when the stream comprises mainly $C_5$ hydrocarbons such as that obtained by depentanizing the effluent of a hydrocarbon cracking operation. However, the term "$C_5$ hydrocarbon stream" is not to be construed to being limited to a stream consisting of only $C_5$ hydrocarbons. Such a $C_5$ hydrocarbon stream should contain at least 85 percent $C_5$ hydrocarbons but can also contain such impurities as $C_4$ hydrocarbons, $C_6$ hydrocarbons, etc. A particularly preferred stream to which the present invention is applicable *is one comprising $C_5$ hydrocarbons and containing about 10 to 40 percent by weight of cyclopentadiene, 10 to 35 percent by weight of isoprene and 8 to 30 percent by weight of piperylene.* In addition to the cyclopentadiene, isoprene and piperylene, such other $C_5$ hydrocarbons as pentanes, pentenes, and the like may be present in the $C_5$ stream.

The conditions of time, temperature, and pressure under which the heat-treatment of the present invention is conducted are most critical and must be strictly adhered to in order to secure the benefits of reduced codimerization. For example, *temperatures higher than 110° C. in the dimerization zone result in too much codimerization of cyclopentadiene and loss of isoprene while temperatures below about 90° C. will result in insufficient dimerization. Likewise, residence times in the dimerization zone of above three hours or below one hour result respectively in too much codimerization or insufficient dimerization.* It is preferred to conduct the dimerization at a temperature of about 95 to 105° C. while maintaining a residence time of from 1½ to 2½ hours. The conditions under which the present invention is operated differ from those of the prior art in one aspect in that it was generally believed that residence times of at least six hours were needed for dimerization at the temperatures under which the present invention operates and some publications suggest times up to twenty-four hours at these temperatures.

Also it should be noted that the benefits of the present invention are accomplished by adjusting the temperature and pressure within the above ranges such as to conduct the dimerization in such a manner that at least a portion of the feed stream within the dimerization zone is refluxing. This is readily accomplished by maintaining the pressure above the liquid in the dimerization zone such that the boiling point of the stream being treated is within the desired temperature range. Suitable pressure will of course vary according to the composition of the particular stream being treated *but generally will be within the range of 50 to 100 p.s.i.g.* To aid in such refluxing, a reflux condenser section may be added to the dimer tank. For purposes of the present invention, any such reflux condenser is included in determining free space within said dimer tank. Appropriate apparatus of wide variety may be used to conduct the dimerization, however, the apparatus should be constructed so as to provide an effective residence time of the liquid flowing therethrough of from about 1 to 3 hours and may be equipped with baffles, packing, and the like. If desired, means for removing heat other than by the aforementioned refluxing may be provided to remove the heat formed by the exothermic dimerization reaction.

The cyclopentadiene within the dimerization zone is dimerized to the extent of at least 90%, and preferably 95%, of the cyclopentadiene being dimerized. However, isoprene dimerization either by itself or by codimerization with other $C_5$ hydrocarbons is below 10%, preferably below 5%, of the available isoprene.

Having dimerized the cyclopentadiene to dicyclopentadiene in the dimerization zone, the dicyclopentadiene may be removed from the lower boiling materials by any suitable means and the particular method used is not a part of the present invention. Suitable means include flash distillation or a stripping column of from 5 to 15 plates and operated at low pressures. However, the kettle temperature in such a stripping column should generally be kept below about 145° C. in order to prevent depolymerization of the dicyclopentadiene.

By way of illustration, the following example is presented. However, such example is not to be construed as limiting of the present invention.

EXAMPLE

A $C_5$ hydrocarbon stream is heat-treated in a dimer tank so as to dimerize the cyclopentadiene therein to dicyclopentadiene. The liquid within the dimer tank occupies about 80% of the free space within said tank. Several runs having different dimerization temperatures and times are presented below to illustrate the efficiency of the present process. The following table shows the composition of the feed stream as well as the compositions of the heat-treated streams and the conditions of heat-treatment. All compositions are in pounds and each run is based on 100 pounds of feed. Runs 2 and 3 represent runs in accordance with the present invention.

TABLE I.—TREATMENT OF HYDROCARBON STREAMS

| Dimerization conditions | Feed | Run number | | | | | |
|---|---|---|---|---|---|---|---|
| | | 1 | 2 | 3 | 4 | 5 | 6 |
| | | 100° C. ½ hr. | 100° C. 2 hrs. | 110° C. 2 hrs. | 130° C. 2 hrs. | 150° C. 2 hrs. | 100° C 5 hrs |
| Components: | | | | | | | |
| $C_4$ | 1.7 | 1.7 | 1.7 | 1.7 | 1.7 | 1.7 | 1.7 |
| Isoprene | 25.2 | 25.0 | 24.6 | 24.2 | 20.7 | 18.8 | 19.7 |
| Cyclopentadiene | 24.6 | 8.6 | 1.7 | 1.0 | 0.7 | 0.4 | 0.5 |
| Piperylenes | 14.2 | 14.2 | 13.9 | 14.1 | 13.8 | 13.5 | 13.8 |
| Other $C_5$'s | 32.3 | 32.2 | 32.2 | 32.0 | 32.0 | 29.8 | 31.5 |
| $C_6+$ | 2.0 | 18.3 | 25.9 | 27.0 | 31.1 | 35.8 | 32.8 |
| Totals, lbs | 100.0 | 100.0 | 100.0 | 100.0 | 100.0 | 100.0 | 100.0 |
| Percent cyclopentadiene dimerized | | 65.0 | 93.1 | 95.9 | 97.0 | 98.5 | 98.2 |
| Percent isoprene lost | | 0.8 | 2.5 | 4.0 | 18.0 | 25.4 | 21.8 |

As may readily be seen, the runs in accordance with the present invention (Runs 2 and 3) show superior results over those runs operated outside the range of the present invention. In Runs 2 and 3 loss of valuable isoprene through codimerization is much lower than in Runs 4, 5, and 6. Run 1 has a lower isoprene loss than Runs 2 and 3, but only 65 percent of the cyclopentadiene was dimerized, thus rendering the results of Run 1 unsatisfactory.

What is claimed is:

1. In a continuous process for the purification of a hydrocarbon stream containing at least 80% by weight $C_5$ hydrocarbons wherein said $C_5$ hydrocarbon portion contains from about 10 to 40% by weight of cyclopentadiene, about 10 to 35% by weight isoprene, and 8 to 30% by weight piperylenes, and wherein said hydrocarbon stream is passed to a dimerization zone and heated in order to dimerize greater than 90% of the cyclopentadiene and the resulting dimers are separated from the effluent of the dimerization zone, the improvement which comprises maintaining said stream while in said dimerization zone under a temperature and pressure such as at least a portion of said stream is refluxing, such pressure within said zone being within the range of 50 to 100 p.s.i.g. and the temperature being within the range of about 90 to 110° C., and maintaining the residence time of said stream in the dimerization zone to be within from about 1 to 3 hours.

2. The process of claim 1 wherein the pressure in said dimerization zone is regulated so as to cause said refluxing at temperatures within the range of about 95 to 105° C.

3. The process of claim 1 wherein less than 10% of the available isoprene is lost through dimerization.

4. The process of claim 1 wherein the hydrocarbon stream and dimer products thereof occupy no greater than 90% of the free space within said dimer tank.

References Cited

UNITED STATES PATENTS

| 2,397,580 | 4/1946 | Ward | 260—666 |
| 2,387,993 | 10/1945 | Hepp | 260—674 |
| 2,704,778 | 3/1955 | Maisel | 260—666 |
| 2,733,285 | 1/1956 | Hamner | 260—681.5X |
| 2,773,106 | 12/1956 | Hamner | 260—681.5 |
| 2,768,224 | 10/1956 | Page et al. | 260—681.5 |
| 3,012,947 | 12/1961 | Kelley et al. | 260—39.5 |
| 3,301,915 | 1/1967 | King et al. | 260—681.5 |
| 3,230,157 | 1/1966 | Hill et al. | 203—53 |

OTHER REFERENCES

Lynn & Healy: "Purification of Isoprene by Fractional Distillation," CEP 57 (5), 46–49 (May 1961).

DELBERT E. GANTZ, Primary Examiner

G. E. SCHMITKONS, Assistant Examiner

U.S. Cl. X.R.

203—28